United States Patent [19]

Engström et al.

[11] Patent Number: 5,378,443
[45] Date of Patent: Jan. 3, 1995

[54] METHOD FOR REDUCING EMISSIONS WHEN BURNING NITROGEN CONTAINING FUELS

[75] Inventors: Folke Engström, Kotka; Mikko Hupa, Turku, both of Finland; Ragnar G. Lundqvist; Yam Y. Lee, both of San Diego, Calif.

[73] Assignee: A. Ahlstrom Corporation, Noormarkku, Finland

[21] Appl. No.: 808,461

[22] Filed: Jan. 3, 1992

[51] Int. Cl.⁶ .............................................. B01J 8/00
[52] U.S. Cl. ............................ 423/239.1; 423/244.07
[58] Field of Search ............................. 423/235, 239.1

[56] References Cited

U.S. PATENT DOCUMENTS

| | | | |
|---|---|---|---|
| 4,300,997 | 11/1981 | Mequerian et al. | 423/239.1 |
| 4,782,771 | 11/1988 | Bergkvist | 423/235 |
| 5,043,150 | 8/1991 | Hiltonen et al. | 423/239.1 |
| 5,048,432 | 9/1991 | Hofmann et al. | 423/235 |
| 5,049,364 | 9/1991 | Yoshimoto et al. | 423/239.1 |
| 5,171,552 | 12/1992 | Miura et al. | 423/239.1 |

*Primary Examiner*—Michael Lewis
*Assistant Examiner*—Thomas G. Dunn, Jr.
*Attorney, Agent, or Firm*—Nixon & Vanderhye

[57] ABSTRACT

The amount of $N_2O$ in flue gases discharged from a fluidized bed combustion system is minimized by adding an $N_2O$ decomposing catalyst in a reactor stage downstream of the combustor. The catalyst preferably is a calcium based sorbent, such as CaO or or limestone, although NiO and other catalysts also may be utilized. Typically, the $N_2O$ decomposition takes place without increasing the temperature of the flue gases above the 700°–1000° C. level that exists combustor. However, under some circumstances, if a second fluidized bed is provided as the reactor stage, additional fuel and oxygen can be added to increase the temperature of the flue gases to insure that it is over 800° C. After $N_2O$ decomposition, the flue gases may be passed through pressurized filter tubes, or through a superheater, economizer, air preheater, optional cyclone separator, and baghouse filter. A cyclone separator is preferably provided between the combustor and reactor stage, and the removed particles are recirculated to the combustor. Removal of particles, including unused sorbent, after the reactor stage also preferably takes place, with recycle to the reactor stage (if a fluidized bed stage) and/or to the combustor.

30 Claims, 3 Drawing Sheets

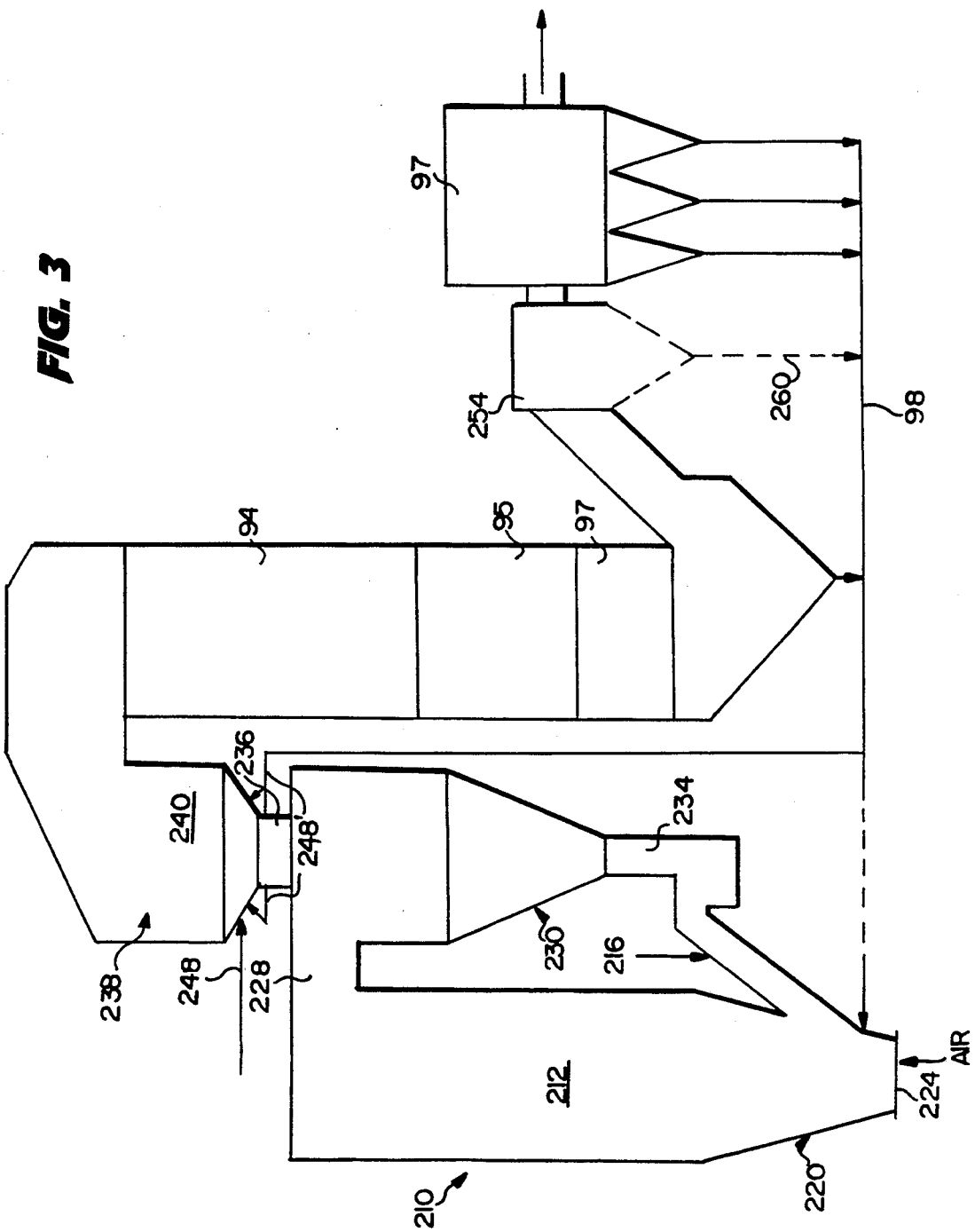

METHOD FOR REDUCING EMISSIONS WHEN BURNING NITROGEN CONTAINING FUELS

BACKGROUND OF THE INVENTION

The present invention relates to a method for reducing emissions, such as sulfur oxides ($SO_2$), nitrous oxides ($N_2O$ and carbon monoxide (CO), to the atmosphere from the combustion of nitrogen containing combustible compounds. More specifically, this invention relates to a method for reducing such emissions when combusting solid fuels or the like in fluidized bed combustors.

Fluidized bed combustion (FBC) is known to result in efficient combustion, as well as, efficient sulfur oxide and nitrogen oxide emission control. Due to intimate mixing of solid material and gases an efficient combustion is achieved in the fluidized bed already at low combustion temperatures 700°–1000° C. Sulfur oxides ($SO_2$) are captured at this relatively low combustion temperature, which is optimal for $SO_2$ reduction by milled limestone injected with the fuel into the combustion chamber. The relatively low combustion temperature needed in a FBC also results in reduced formation of nitrogen oxides $NO_x$, i.e. $NO_2$ and NO. $NO_x$ emissions from FBC are typically in the range of 100–400 ppm.

The above mentioned improvements in fluidized bed technology over conventional flame combustion are enhanced in circulating fluidized bed combustion (CFBC). Besides providing the possibility of burning different fuels in the same combustor, i.e. both high and low grade fuels, the CFB boiler technology provides better means of controlling the combustion process leading to improved boiler efficiency and improved control of sulfur oxide ($SO_2$) and nitrogen oxide ($NO_x$) emissions. $NO_x$ emissions from CFB boilers are in the range of 150–200 ppm.

Recently attention has been focused on the emission of nitrous oxide ($N_2O$) from combustors. The atmospheric concentration of $N_2O$ increases constantly and it is believed to have an effect on the atmosphere. While the greenhouse effect has mainly been associated with increased $CO_2$ levels in the atmosphere, concern is now growing about strong infrared absorbers, such as $N_2O$, contributing to the greenhouse effect even if the concentration of $N_2O$ is much lower than that of $CO_2$. Further, according to recent research, $N_2O$ may indirectly adversely affect the stratospheric ozone layer as well.

Recent studies indicate that fluidized bed combustion, while achieving significantly lower levels of $NO_x$ emissions compared to flame or pulverized coal combustion, may yield higher levels of $N_2O$. It has been reported that $N_2O$ emissions are generated in higher degree in combustors with low combustion temperatures such as 750°–900° C. At higher temperatures the formation of $N_2O$ does not seem to be a problem, as the formation of $N_2O$ is minor, while the reduction of $N_2O$ to $N_2$ at the same temperature is high.

The likely main mechanism for $N_2O$ formation from fuel nitrogen has been suggested to be the following:

FUEL-N→HCN

HCN+O→NCO

NCO+NO→$N_2O$

At the present time, however, the details of the mechanisms of $N_2O$ formation are not known.

The combustion temperature and the type of fuel seem to be the main factors affecting the $N_2O$ emission. According to tests the emissions decrease significantly when the combustion temperature is increased over 900° C. In the combustion of coal, $N_2O$ emissions varied typically from 30 to 120 ppmv (3% $O_2$, dry), whereas in the combustion of oil shale, peat and wood waste $N_2O$ emissions were typically significantly lower, below 50 ppmv.

There seems to be a strong correlation between temperature and both $NO_x$ and $N_2O$ emissions. Changes to the combustion operating parameters affect $NO_x$ and $N_2O$ emissions inversely. Increasing temperatures result in higher $NO_x$ and lower $N_2O$. Weaker correlations appear to exist for other parameters. A bed temperature increase in the combustion chamber would however result in reduced capability to capture $SO_2$. Staged combustion seems to reduce both $N_2O$ and $NO_x$ emissions to a certain degree, but easily leads to an increase in carbon monoxide (CO) concentration.

One method to reduce the $N_2O$ emissions, suggested in U.S. Pat. No. 5,043,150, is to add hydrogen radicals to the flue gases by providing an additive capable of forming hydrogen radicals at temperatures equal to or higher than those of the flue gases. The hydrogen radicals effectively destroy $N_2O$ through the homogenous gas reaction (A) $N_2O + H \rightarrow N_2 + OH$ Additives providing hydrogen radicals are e.g. methane, liquified petroleum gas, oil, alcohol, pyrolyser gas, or gasifier gas. The hydrogen radical formation is favored at higher temperatures. Apparently by increasing the flue gas temperature the rate of the reaction (A) is also increased and a rapid $N_2O$ destruction may be accomplished.

U.S. Pat. No. 5,048,432, European patent application EP 0 406 185, and German patent application DE 39 33 286 all suggest raising the temperature of flue gases to a level above 900° C. for reducing $N_2O$ emissions.

Other parameters potentially affecting $N_2O$ emissions have also been studied, such as increase of excess air, injection of ammonia, recirculation of fly ash, CO concentration, and addition of limestone. Some studies show slight effects of above mentioned parameters, either decreasing or increasing $N_2O$ emissions, but no clear picture has developed. E.g. $N_2O$ has been found to decompose on the surface of calcined limestone CaO, while simultaneously the NO emissions increase. It has, on the other hand, also been reported that $N_2O$ may result from NO reduction on $CaSO_x$ surfaces, $CaSO_x$ being formed by reduction of $SO_2$ with CaO, the higher the Ca/S ratio the higher the NO reduction on $CaSO_4$. Therefore, until now, no clear conclusion could be drawn on the effect of boiler limestone addition on emissions.

It is, however, known that $N_2O$ emissions from fluidized bed boilers may be on the level of 50–200 ppm, i.e. higher than desired. Therefore, according to this invention a method is provided for reducing the emissions of $N_2O$ from conventional fluidized bed boilers and circulating fluidized bed boilers, atmospheric or pressurized. The method according to the invention also may decompose CO in the flue gases, and improve the $SO_2$ reduction in flue gases from a fluidized bed boiler.

The method of the invention simultaneously reduces $N_2O$, $SO_2$, and CO in flue gases, thereby improving the environmental properties of fluidized bed combustor systems.

SUMMARY OF THE INVENTION

According to a general aspect of the present invention, a method for reducing the emissions of $N_2O$ in flue gases from the combustion of nitrogen containing fuel in a fluidized bed combustor is provided. The combustor has a combustion stage with a fluidized bed of particles. The method comprises the steps of continuously: (a) Supplying nitrogen containing fuel and an oxygen containing gas for combustion of the fuel into the combustion stage of the combustor. (b) Maintaining a temperature of about 700° to 1000° C. in the combustion stage. (c) Supplying a Ca-based sulfur absorbing sorbent to the combustor for reducing sulfur emissions in flue gases. (d) Discharging flue gases from the combustor. (e) Removing particles from the flue gases, and passing the flue gases with removed particles to a reactor stage. (f) In the reactor stage, introducing an $N_2O$ decomposing catalyst into the flue gases without raising the temperature of the flue gases; and (g) discharging the flue gases with the $N_2O$ therein decomposed from the reactor stage.

Step (f) is preferably practiced by adding a catalyst selected from the group consisting essentially of calcium based sorbents, siderite, ankerite, NiO, CuO, and MgO. A calcium based sorbent is preferred, such as limestone (which calcines to CaO), $Ca(OH)_2$, or CaO. Unused $N_2O$ decomposing catalyst is recovered from the flue gases being discharged from the reactor stage, and may be recirculated to the reactor stage (particularly if the reactor stage is a second fluidized bed), or to the combustor.

Steps (a)–(g) may be practiced under pressure significantly greater than 1 atmosphere, and the method may comprise the further step of filtering (under pressure) the flue gases discharged from the reactor stage. The particles filtered out of the gases may be returned to the combustor. Alternatively, there may be the further steps after step (g) of passing the flue gases through, in sequence, a superheater, an economizer, an air preheater, an optional cyclone separator, and a baghouse filter. Where the reactor stage is a second fluidized bed, step (a) may be practiced to provide more than a stoichiometric amount of oxygen containing gas to the combustion stage in order to provide oxidizing conditions in the flue gases oxidizing the combustor in step (d).

According to one detailed aspect of the present invention, a method of reducing the emissions of $N_2O$ in flue gases from the combustion of nitrogen containing fuel in a fluidized bed combustor is provided. A combustion stage with a first fluidized bed of particles is arranged in a fluidized bed combustor. A fuel containing nitrogen and a gas containing oxygen is supplied for combustion of the fuel in the combustion stage of the combustor, while maintaining a temperature of about 700° to 1000° C. in the combustion stage. Excess of an oxygen containing gas at an air/fuel stoichiometric ratio of $>1$ may preferably be introduced for combustion of the fuel (i.e. oxygen-containing gas may be injected into the combustion stage in an amount to generate flue gases containing residual oxygen). Ca-based sulfur absorbing absorbent, such as uncalcined limestone, calcined limestone (CaO), or $Ca(OH)_2$, is supplied to the combustor for reducing sulfur emissions in the flue gases. The flue gases are discharged from the combustor. The discharged flue gases are introduced into a fluidized bed reactor with a second fluidized bed of particles and Ca-based sorbent is supplied into the fluidized bed reactor, for catalyzing the decomposition of $N_2O$ in the flue gases and for reducing residual $SO_2$ in the flue gases. A good mixing of the sorbent and flue gases is achieved in the fluidized bed reactor. This facilitates $N_2O$ decomposition, $SO_2$ reduction and CO oxidation, whereafter particles are separated from the flue gases.

The detailed method described above preferably utilizes Ca-based sorbent such as limestone for destruction of $N_2O$. Ca-based sorbent is also introduced into the fluidized bed combustor, where at a combustion temperature of about 700°–1000° C., combustion and initial $SO_2$ capture take place under oxidizing conditions. The flue gases discharged from the combustor are thereafter preferably led uncooled into the fluidized bed reactor for a subsequent gas cleaning stage. Ca-based sorbent such as limestone ($CaCO_3$), $Ca(OH)_2$ or CaO is introduced into the reactor, whereby $CaCO_3$ is calcined at the inlet at a temperature $>800°$ C. and $Ca(OH)_2$ already at temperatures $>700°$ C. In the reactor, with a Ca-based sorbent as bed material, reduction of $N_2O$ takes place when mixing fresh CaO sorbent into the flue gases. CaO surfaces also efficiently catalyze the oxidation of any CO remaining in the flue gases from the combustor.

Besides destruction of $N_2O$, reduction of residual $SO_2$ takes place in the reactor at 700°–1000° C. The reactor is preferably provided with a highly turbulent bed of fluidized particles, the gas velocity in the reactor may be e.g. about 3–10 m/s, wheras the velocity in the combustor normally is about 1–6 m/s.

When combusting the fuel in a circulating fluidized bed combustor the flue gases are led via a first particle separator into the subsequent cleaning stage in the fluidized bed reactor. Solid particles are separated from the flue gas suspension in the first particle separator, which e.g. can be a cyclone or some other type of particle separator. After that, the particles are reintroduced into the lower part of the combustor, for maintaining a circulating bed of particles in the combustor.

The fluidized bed reactor, which is utilized for additional cleaning of the flue gases, is provided with a second particle separator for separating particles from the flue gas suspension being discharged from the reactor. Particles separated in the second particle separator may be reintroduced into the reactor, thereby maintaining a bed inventory and also establishing a circulating fluidized bed in the reactor. A part of the particles, i.e. sorbent material, separated in the second particle separator may also be introduced into the lower part of the combustor or alternatively into the first particle separator. Thereby a portion, or under certain conditions all, of the Ca-sorbent needed in the combustor may be first introduced into the reactor for calcining reactions and therefrom into the combustor.

The present invention provides following improvements over conventional combustion and $SO_2$ capture in a single fluidized bed reactor:

$SO_2$ emissions are decreased further from the already rather low emission level of flue gases from a FBC. In the reactor the flue gases are additionally cleaned by contacting them with fresh highly unsulfonated CaO, resulting in a rapid further reduction of $SO_2$.

$N_2O$ emissions are decreased. The fresh Ca-sorbent calcined "in situ" acts as a very efficient catalyst for the $N_2O$ decomposing reaction $$N_2O\ (+CaO\ catal.) > N_2 + \tfrac{1}{2} O_2.$$

This reaction is fast and takes place at much lower temperatures than a thermal decomposition reaction without catalyst, i.e., $$N_2O + M > N_2 + O + M$$

CaO is a highly more efficient catalyst than $SiO_2$ (sand), ash, or the partly sulfated lime ($CaSO_4$), present in a normal fluidized bed. A catalytic $N_2O$ decomposition cannot efficiently be performed in a highly sulfated Ca-sorbent bed in the combustor. The $N_2O$ decomposition reaction needs fresh CaO surface to catalyze the reactions.

According to the present invention the flue gases do not have to be heated, as suggested in earlier methods for decreasing $N_2O$ emissions (e.g. U.S. Pat. No. 5,048,432).

CO concentration in flue gases is decreased substantially due to increased residence time and good mixing in the second fluidized bed in the fluidized bed reactor. Additionally fresh CaO acts as catalyst for the following oxidizing reaction:

$$CO + \tfrac{1}{2} O_2\ (+CaO,\ catalyst) > CO_2$$

New NO is not formed in the reactor, which would be the case if large amounts of CaO were introduced into the combustion stage, whereby $NH_3$ formed from fuel nitrogen would react in the presence of $O_2$ according to $$NH_3\ (+CaO,\ catalyst) > NO$$

in the combustor, the reaction being catalyzed by CaO. The flue gases coming from the combustor stage into the fluidized bed reactor do not contain significant $NH_3$ derived from fuel, which $NH_3$ would react according to above reaction.

The combustion according to the present invention may be performed at an air/fuel stoichiometric ratio $>1$ in order to avoid $NH_3$ in the flue gases. Over-stoichiometric conditions in the combustor are optimal for efficient $SO_2$ reduction as well.

At low load the flue gas temperature in the reactor may be below the calcining temperature of limestone ($CaCO_3$). In that case fuel may be introduced into and combusted at the inlet end of the reactor for increasing the temperature sufficiently high to affect calcination of limestone. Thereby CaO is produced, which is an active component promoting $N_2O$ destruction and $SO_2$ reduction. Limestone calcination needs a temperature of $>800°$ C. at atmospheric pressure conditions. In pressurized systems the temperature needs to be somewhat higher.

It is a primary object of the present invention to provide for the effective reduction of the amount of $N_2O$ pollution from fluidized bed combustors; and optionally to further reduce $SO_2$ and CO emissions. This and other objects of the invention will become clear from an inspection of the detailed description of the invention, and from the appended claims.

BRIEF DESCRIPTION OF THE DRAWINGS

FIG. 3 is a schematic view of a third embodiment according to the invention utilizing a different treatment of the flue gases downstream of the reactor.

DETAILED DESCRIPTION OF THE DRAWINGS

Figure 1:
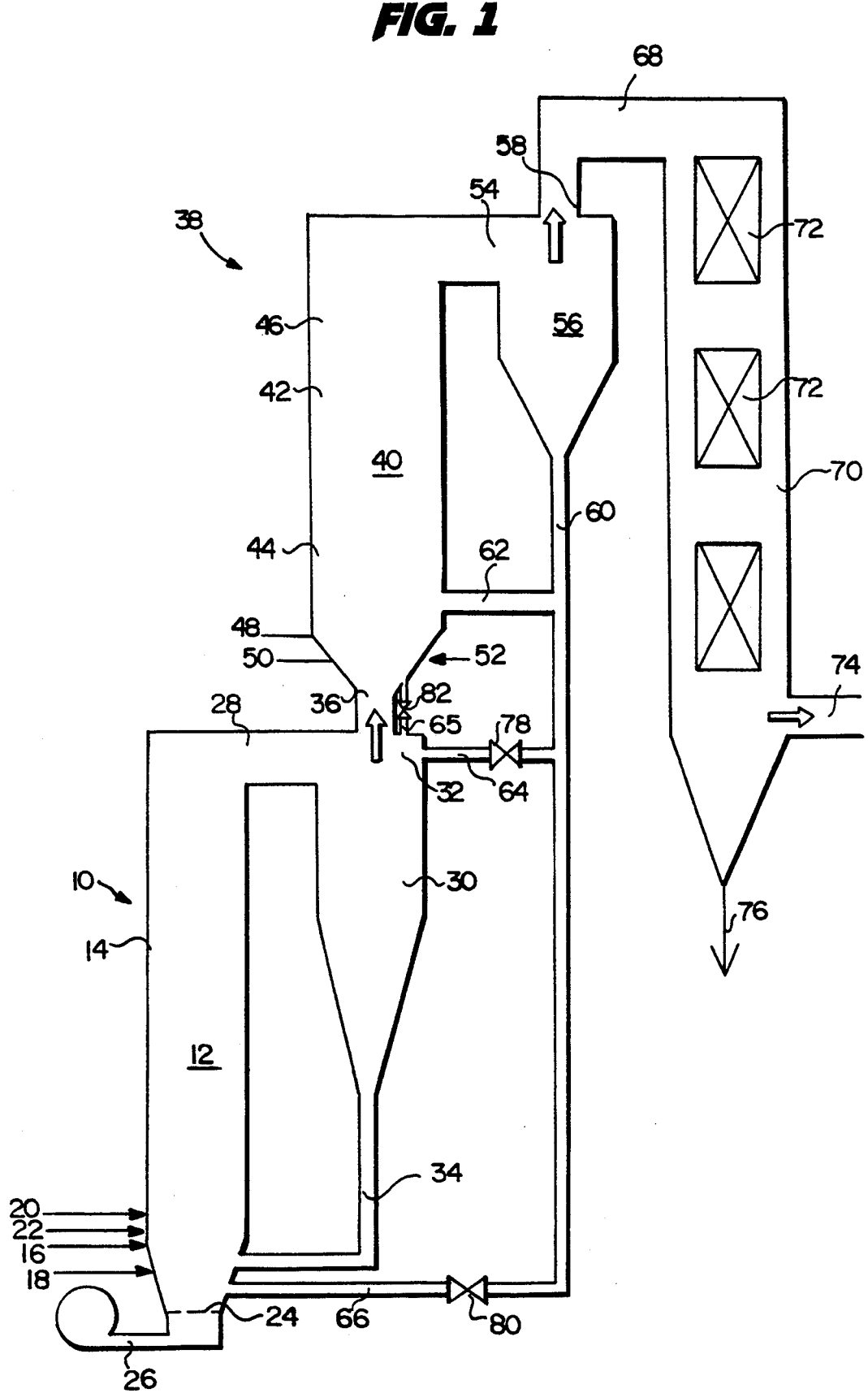
FIG. 1 is a schematic of a first exemplary embodiment of apparatus according to the present invention, which utilizes a circulating fluidized bed reactor connected to the flue gas discharged from the circulating fluidized bed combustor.

A preferred embodiment of the present invention is shown schematically in FIG. 1, wherein solid fuel material is combusted in a circulating fluidized bed combustor 10. The combustor 10 includes a combustion chamber 12 containing a fluidized bed of particles 14 with inlet 16 for fuel, inlets 18,20 for secondary and tertiary air, and inlet 22 for sorbent material such as limestone, lime, or the like, for the reduction of $SO_2$ in the flue gases, fluidizing air is led into the combustion chamber 12 through a bottom plate 24 from a windbox 26. The air is led into the chamber 12 at a pressure and flow rate (e.g. about 1–6 m/s) high enough to fluidize the bed and entrain a portion of the solid particles.

The combustion chamber 12 has an outlet 28 for flue gases containing entrained solid particles. The flue gases are led to a cyclone separator 30 where solid particles are separated from the gases. The cleaned gas is discharged through a gas outlet opening duct 32 and the particles separated from the gases in cyclone 30 are led downwards through a vertical return duct 34 back into the lower part of the combustion chamber 12.

The cleaned gas is led via the gas outlet opening 32 into a gas passage 36 which connects the combustor 10 with a reactor stage, specifically a fluidized bed reactor 38 (i.e., a second fluidized bed). The reactor 38 includes a reactor chamber 40 containing a second fluidized bed of particles The reactor chamber 40 has a lower part constituting a mixing chamber 44 and an upper part constituting a riser 46. An inlet 48 for sorbent material, such as lime or limestone, is arranged in the mixing chamber 44, for catalyzing the $N_2O$ decomposition and reduction of residual $SO_2$ in flue gases. Inlets 50, 52 for additional fuel and oxygen containing gas may be provided in the lowermost part of the mixing chamber 44 for increasing the temperature in the reactor 38 if necessary for calcining of the sorbent material, although it is desirable according to the invention to decrease $N_2O$ emissions without substantial heating of the flue gases.

The flue gas is introduced as fluidizing gas into the mixing chamber 44 at a relatively high flow rate, e.g., about 3–10 m/s, and preferably $>5$ m/s, i.e. high enough to fluidize the sorbent bed in the reactor, vigorously mix sorbent and gases, and entrain a portion of the solid particles with the flue gases.

The reactor chamber 40 has an outlet 54 for flue gases containing entrained solid particles. The flue gas suspension is led to a cyclone separator 56 where solid sorbent particles are separated from the gases. The cleaned gas is discharged through a gas outlet opening duct 58. The particles separated from the gas are led downwards through a vertical duct 60 and through duct 62 back into the mixing chamber 44, for maintaining a bed in the reactor chamber 40. The particles may also be led through duct 60 and duct 64 into the cyclone 30 or further through duct 66 into the lower part of the combustion chamber 12, for discharging some of the spent or newly introduced sorbent material from the reactor 38 into the combustor 10. Particles may also be discharged directly from the mixing chamber 44 through conduit 65 into the cyclone 30.

The clean gas is desirably led via gas outlet opening 58 into a gas passage 68 connecting the fluidized bed reactor 38 with a convection section 70. Heat transfer surfaces 72 are arranged in the convection section. Gas outlet 74 is arranged in the bottom part of the convection section 70, as well as a fly ash outlet 76.

In operation of the FIG. 1 embodiment, combustion with over-stoichiometric conditions is effected in the combustion chamber 12 at a relatively low temperature of about 700°–1000° C., e.g. combusting coal at about 850° C. At this temperature a low $NO_2$ formation is achieved and maximum sulphur capture with lime occurs. Air may be introduced at different levels in order to achieve staged combustion and minimal $NO_x$ formation. Flue gases containing residual oxygen and $N_2O$, as well as minor amounts of $SO_2$ and entrained particles, are discharged through the gas outlet 28 into the cyclone 30. Bed particles containing unreacted sorbent are separated from the flue gases and recycled into the combustion chamber 12.

The flue gas from cyclone 30 is introduced as fluidizing gas into the fluidized bed reactor An $N_2O$ decomposing material, such as siderite, ankerite, NiO, CuO, or MgO, but preferably Ca-based sorbent, such as lime, limestone, or $Ca(OH)_2$, is mixed into the flue gas in the mixing chamber 44. The sorbent is calcined in the hot flue gas flow and, where Ca-based sorbent is utilized, provides CaO formed "in situ" to catalyze $N_2O$ decomposition reactions. At low loads fuel and oxygen or air may have to be combusted in the mixing chamber 44 to increase the temperature therein to a level sufficient for calcination of limestone. Reactions between fresh sorbent and residual $SO_2$ take place and decrease the $SO_2$ emissions to a minimum level.

Sorbent material introduced into the fluidized bed 14 of combustor 10 is deactivated by a layer of reacted $CaSO_4$ around the CaO particles, due to the sulphation reactions and high sulphate content of the lime particles, thus preventing optimal utilization of the sorbent for catalytic reactions. In the fluidized bed reactor 38, on the other hand, fresh sorbent material introduced thereto is very active, whereby sulphur capture is achieved. The sorbent material preferably has a particle size about 1–1000 microns, i.e. has a very high active surface area and is not deactivated in the reactor 38 by extensive sulphate formation.

The flue gases and entrained particles are discharged via outlet 54 into the cyclone 56, where unreacted and reacted sorbent particles are separated from the flue gases. The sorbent particles may partly be recycled into the mixing chamber 44 and partly to the combustor cyclone 30 or the lower part of the combustor 10. Valves 78, 80, 82 control the sorbent flow into the combustor 10.

The invention utilizing the FIG. 1 apparatus thus provides a method for substantially improving minimal $NO_x$ emissions. $N_2O$ is decomposed at optimal the reduction of emissions from an FBC system. The combustion conditions are controlled to achieve conditions catalyzed by fresh CaO (or the like) in the fluidized bed reactor. And, a major part of the $SO_2$, at least 50%, preferably about 70–90%, in the flue gases is captured in the combustor 10 and substantially all of the residual part in the fluidized bed reactor 38.

Sorbent material may be supplied independently into the combustion chamber 12 and the reactor chamber 40, or the main part of the sorbent may be calcined in the reactor 38 and supplied therefrom into the combustion chamber 12. At least about 10 to 30% of total amount of sorbent needed for $SO_2$ reduction is preferably introduced into the reactor 38 and 70 to 90% into the combustor 10.

Figure 2:
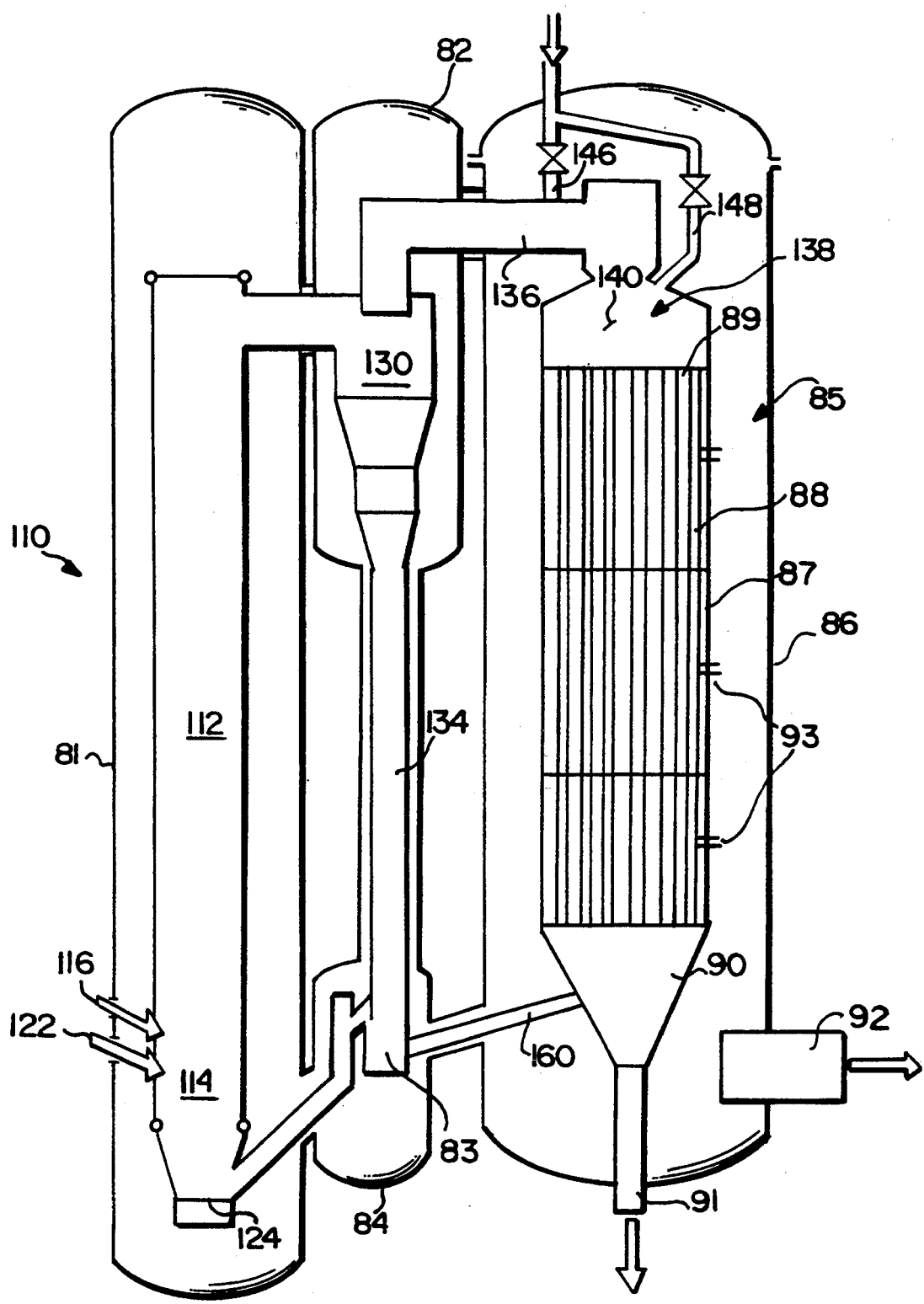
FIG. 2 is a schematic view of a second embodiment according to the invention, comprising a pressurized circulating fluidized bed system utilizing a different type of reactor than in FIG. 1, and with ceramic tube filters for the flue gases.

In the FIG. 2 embodiment, a pressurized fluid bed combustor and associated apparatus is provided. In this embodiment, no second fluidized bed is provided as a reactor stage, but rather the reactor stage merely comprises an open chamber into which $N_2O$ decomposition facilitating catalyst is injected. In the FIG. 2 embodiment, structures comparable to those in the FIG. 1 embodiment are shown by the same reference numeral only preceded by a "1".

The fluidized bed combustor 110 has a combustion chamber 112 with a fluidized bed of particles 114, in a pressure vessel 81, a cyclone separator 130 arranged in a pressure vessel 82, and a return leg 134 and loop seal 83 are arranged in a pressure vessel 84. The gas outlet duct 136 from the cyclone 130 is connected with a filter 85, which is arranged in a pressure vessel 86. The filter comprises a filtration chamber 87 with vertical ceramic filter tubes 88 supported by support plates 89. The filter tubes 88 are open at both ends and connected to an upper chamber 140 and lower chamber 90 in the filter 85. The gas outlet duct 136 is connected to the upper chamber 140. The lower chamber 90 is funnel shaped and comprises a solids outlet 91. The pressure vessel 86 includes a gas outlet 92.

According to the invention, an inlet 148, 148' for $N_2O$ decomposition catalyst, such as a Ca-based sorbent, siderite, NiO, MgO, etc., is provided the gas outlet duct 136 and/or in the upper chamber 140 of reactor stage 138. At these locations the flue gases and fresh Ca sorbent, etc., are rapidly mixed.

Fuel and sulphur absorbing Ca-based sorbent is added into the combustion chamber through inlet ducts 116 and 122. Fluidizing air is introduced through the bottom plate 124 of the combustion chamber 112. Fuel is combusted and the main part of sulphur is absorbed by the sorbent already in the combustor 110. Flue gases and bed particles are discharged into the cyclone 130 from which separated particles are recycled through the return leg 134 and the loop seal 83 into the bottom part of the combustion chamber 112 in order to keep a circulating mass of solid particles in the combustor 110.

Flue gases still containing some $So_2$, and containing $N_2O$, flow through gas outlet duct 136 into the upper chamber 140 in the filter 85. Fresh Ca-based sorbent is introduced into the flue gas flow in the gas duct 136 itself or in the upper chamber 140. The sorbent being fresh and very rapidly mixed into the flue gas flow reacts very effectively with $SO_2$, $N_2O$, and CO. The flue gases and sorbent material enter the filter tubes 88. Clean gases flow, due to pressure difference through the porous tube 88 walls, into the filtration chamber 87 and through outlets 93 into the pressure vessel 86 surrounding the filter tubes 88. The clean gases leave the filter 85 through outlet 92.

Solid particles separated from the clean gases flow downwardly through the filter tubes 88 and are collected in the lower chamber 90. The Ca-based sorbent still active is at least partly recycled into the combustor 110 through duct 160. Some solid matter may be discharged from the system through outlet 91.

The same benefits achieved with the embodiment shown in FIG. 1 can be achieved with the embodiment of FIG. 2, which is applicable for pressurized systems.

In the embodiment of FIG. 3, structures comparable to those in the FIG. 1 embodiment are shown by the same reference numeral only preceded by a "2". In this embodiment, after discharge of the flue gases from the cyclone 230 into the conduit 236, they pass into the reactor stage 238, comprising a reactor chamber 240. No fluidized bed is provided in the reactor chamber 240, rather it is merely a mixing chamber for catalyst (such as calcium based absorbent, siderite, ankerite, NiO, CuO, or MgO), which is introduced by conduits 248, 248'. After mixing in the chamber 240, without any increase in temperature (from the level of about 700°–1000° C. of the combustion chamber 212), and after a residence time of only about 2 seconds or less, a major part of the N$_2$O reduction takes place. Solids would escape the system into backpass while the reacting continues in the backpass since temperatures of 600°–700° C. still exist.

In the FIG. 3 embodiment, after the reactor stage 238, the flue gases then pass to a superheater 94, an economizer 95, an air preheater 96, to an optional cyclone separator 254, and then to a baghouse filter 97. Part of the flyash and sorbent separated in the baghouse filter 97 and optional cyclone separator 254 is recycled back—through line 98—to the mixing chamber 240 of the reactor 238, and/or to the bottom of the combustor 210. Alternatively, a separator may be provided upstream of the baghouse filter 97 (the separator not shown) to separate sorbent from flyash and recycle only the sorbent back in line 98.

The system described in FIG. 3 is less expensive than the circulating bed reactor as shown in FIG. 1, yet can effectively minimize N$_2$O emissions, as well as SO$_2$ and CO emissions.

It will thus be seen that according to the present invention an effective method for removing N$_2$O, and typically SO$_2$ and CO, from the flue gases of a fluidized bed reactor is provided.

While the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. A method for reducing the emissions of N$_2$O in flue gases from the combustion of nitrogen containing fuel in a fluidized bed combustor, which has a combustion stage with a fluidized bed of particles, comprising the steps of continuously:

(a) supplying nitrogen containing fuel and an oxygen containing gas for combustion of the fuel into the combustion stage of the combustor;

(b) maintaining a temperature of about 700° to 900° C. in the combustion stage in which N$_2$O is formed;

(c) supplying a Ca-based sulfur absorbing sorbent to the combustor for reducing sulfur emissions in flue gases;

(d) discharging flue gases from the combustor;

(e) passing the flue gases to a reactor stage;

(f) in the reactor stage, introducing an N$_2$O decomposing catalyst into the flue gases without significantly raising the temperature of the flue gases; and (g) discharging the flue gases with the N$_2$O therein decomposed from the reactor stage.

2. A method as recited in claim 1 comprising the further step (h) of recovering unused N$_2$O decomposing catalyst from the flue gases being discharged from the reactor stage.

3. A method as recited in claim 2 wherein step (f) is practiced by adding as a catalyst siderite, ankerite, NiO, CiO, or MgO.

4. A method as recited in claim 2 wherein step (f) is practiced by adding as a catalyst limestone, Ca(OH)$_2$ or CaO, having a particle size of about 1–1000 microns.

5. A method as recited in claim 1 wherein step (f) is practiced, and the conditions in the reactor stage are maintained, so that the temperature in the reactor stage is about 800°–1000° C.

6. A method as recited in claim 1 wherein step (e) is also to remove particles from the flue gases before they pass to the reactor stage.

7. A method as recited in claim 1 wherein step (f) is practiced by adding as a catalyst calcium based sorbents, siderite, ankerite, NiO, CuO or MgO.

8. A method as recited in claim 1 wherein step (f) is practiced by adding as a catalyst limestone, Ca(OH)$_2$, or CaO, having a particle size of about 1–1000 microns.

9. A method as recited in claim 1 wherein steps (a)–(g) are practiced under pressure significantly greater than one atmosphere, and comprising the further step of filtering under pressure the flue gases discharged from the reactor stage.

10. A method as recited in claim 1 comprising the further steps, after step (g), of passing the flue gases through, in sequence, a superheater, economizer, air preheater, and baghouse filter.

11. A method as recited in claim 10 comprising the step of passing the flue gases through a cyclone separator between the air preheater and baghouse filter.

12. A method as recited in claim 1 comprising the further step of establishing a second fluidized bed of particles in the reactor stage, the flue gases providing at least part of the fluidizing gas for the second fluidized bed of particles.

13. A method as recited in claim 12 wherein step (f) is practiced by adding a calcium based sorbent to the second fluidized bed, so that SO$_2$ removal and CO decomposition are also practiced.

14. A method as recited in claim 12 wherein step (a) is practiced to provide more than a stoichiometric amount of oxygen containing gas to the combustion stage in order to provide oxidizing conditions in the flue gases exiting the combustor in step (d).

15. A method for reducing the emissions of N$_2$O in flue gases from the combustion of nitrogen containing fuel in a fluidized bed combustor, which has a combustion stage with a fluidized bed of particles, comprising the steps of continuously:

(a) supplying nitrogen containing fuel and an oxygen containing gas for combustion of the fuel into the combustion stage of the combustor;

(b) maintaining a temperature of about 700° to 900° C. in the combustion stage in which N$_2$O is formed;

(c) supplying a Ca-based sulfur absorbing sorbent to the combustor for reducing sulfur emissions in flue gases;

(d) discharging flue gases from the combustor;

(e) in a reactor stage, introducing as an $N_2O$ decomposing catalyst into the flue gases calcium based sorbents, siderite, ankerite, NiO, CuO, or MgO, and maintaining the temperature in the reactor stage at above 800° C.; and (f) discharging the flue gases, with $N_2O$ removed therefrom, from the reactor stage.

16. A method as recited in claim 15 wherein steps (a)–(f) are practiced under pressure significantly greater than one atmosphere, and comprising the further step of filtering under pressure the flue gases discharged from the reactor stage.

17. A method as recited in claim 15 comprising the further step, after (f), of passing the flue gases through, in sequence, a superheater, economizer, air preheater, and baghouse filter.

18. A method as recited in claim 15 comprising the further step of establishing a second fluidized bed of particles in the reactor stage, the flue gases providing at least part of the fluidizing gas for the second fluidized bed of particles.

19. A two staged combustion and gas cleaning method utilizing first and second fluidized bed systems, a fluidized bed combustion system and a fluidized bed flue gas cleaning system, comprising the steps of:

(a) supplying fuel to the first fluidized bed system, the fuel remaining fluidized during the combustion thereof; minimizing $NO_x$ emissions from the first system;

(b) supplying combustion air in a manner to provide for staged combustion of the fuel, for (c) operating the first system under oxidizing conditions at a temperature of about 700° to 900° C., in which $N_2O$ is formed, to provide a substantially complete combustion of the fuel;

(d) supplying Ca-based sorbent to the first system for absorbing the major part of gaseous sulfur compounds released during combustion of the fuel;

(e) separating solids from the flue gases of the first system;

(f) introducing the flue gases, after separation of solids therefrom, from the first system as fluidizing gas into the second fluidized bed system;

(g) introducing catalyst material into the second system for catalyzing $N_2O$ decomposition in the second system; and (h) separating solids from the flue gases of the second system.

20. A method as recited in claim 19 wherein the fluidized beds are circulating fluidized beds, and wherein steps (e) and (h) are practiced by recirculating the solids to the fluidized beds, 21. A method as recited in claim 20 wherein step (h) is further practiced by recirculating the main part of the separated solids to the reactor and introducing another part of the separated solids into the first system.

22. A method as recited in claim 19 wherein step (g) is practiced by introducing fresh calcium based sorbent for catalyzing $N_2O$ decomposition and for absorbing residual sulfur compounds in the flue gases.

23. A method according to claim 19, comprising the further step of maintaining a temperature of about 700°–1000° C. in the second system.

24. A method according to claim 19, comprising the further step of increasing the temperature of the flue gases by introducing fuel and oxygen containing gas or preheated gas into the second system.

25. A method according to claim 22, wherein the Ca-based sorbent is supplied to the combustor in an amount sufficient to absorb at least 50% of sulfur oxides in the flue gases in the combustor.

26. A method according to claim 22, wherein Ca-based sorbent is supplied to the combustor in an amount sufficient to absorb 70–90% of the sulfur in the flue gases in the combustor.

27. A method according to claim 19, wherein step (f) is practiced by introducing the flue gases into the second fluidized bed to provide a velocity of greater than 5 m/s therein.

28. A method according to claim 19, comprising the further step of supplying additional heat to the second fluidized bed by adding oxygen containing gas and fuel or preheated gas to increase the temperature in the second bed to a level above 800° C. to allow calcination of Ca-based sorbent to form fresh CaO "in situ" in the reactor.

29. A method according to claim 28, wherein step (g) is practiced by introducing limestone into the second fluidized bed to be calcined into CaO.

30. A method according to claim 19, wherein step (g) is practiced to introduce $Ca(OH)_2$ or CaO.

* * * * *